United States Patent
Schmitt et al.

(10) Patent No.: US 7,445,728 B2
(45) Date of Patent: *Nov. 4, 2008

(54) MIXTURES FOR PRODUCING TRANSPARENT PLASTICS, TRANSPARENT PLASTICS AND METHOD FOR PRODUCING THE SAME AND THE USE THEREOF

(75) Inventors: Bardo Schmitt, Mainz (DE); Patrik Hartmann, Buettelborn (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/547,238

(22) PCT Filed: Jan. 19, 2005

(86) PCT No.: PCT/EP2005/000465

§ 371 (c)(1),
(2), (4) Date: Oct. 3, 2006

(87) PCT Pub. No.: WO2005/100422

PCT Pub. Date: Oct. 27, 2005

(65) Prior Publication Data
US 2007/0203286 A1   Aug. 30, 2007

(30) Foreign Application Priority Data
Apr. 19, 2004 (DE) .................. 10 2004 019 415

(51) Int. Cl.
*C09K 3/00* (2006.01)

(52) U.S. Cl. .................. 252/182.17; 252/182.18; 252/182.23; 252/182.28; 252/183.11

(58) Field of Classification Search ............ 252/182.17, 252/182.18, 182.28, 182.23, 183.11
See application file for complete search history.

(56) References Cited

U.S. PATENT DOCUMENTS

| 5,047,576 A | * | 9/1991 | Takenosita et al. | ........... 560/125 |
|---|---|---|---|---|
| 5,270,439 A | * | 12/1993 | Maruyama et al. | ........... 528/373 |
| 6,342,571 B1 | * | 1/2002 | Smith et al. | ................ 526/286 |
| 6,698,883 B2 | * | 3/2004 | Momoda et al. | ............. 351/162 |

FOREIGN PATENT DOCUMENTS

| EP | 0 592 935 | 4/1994 |
|---|---|---|
| WO | 03 011925 | 2/2003 |
| WO | 03 011926 | 2/2003 |

OTHER PUBLICATIONS

U.S. Appl. No. 10/588,210, filed Aug. 2, 2006, Schmitt et al.
U.S. Appl. No. 10/587,257, filed Jul. 26, 2006, Schmitt et al.

* cited by examiner

*Primary Examiner*—Vasu Jagannathan
*Assistant Examiner*—Karuna P Reddy
(74) *Attorney, Agent, or Firm*—Oblon, Spivak, McClelland, Maier & Neustadt, P.C.

(57) ABSTRACT

The invention relates to mixtures for producing transparent plastic, which mixtures comprise: a) compounds of formulae (I) and (II), wherein $R^1$ independently represents hydrogen or a methyl group, $R^2$ independently represents a linear or branched, aliphatic or cycloaliphatic group or a substituted or unsubstituted aromatic or heteroaromatic group and m and n independently represent an integer $\geq 0$, with m+n>0, b) a prepolymer produced from polymethacrylate and alkyldithiols or polythiols, preferably HS—$R^3$—SH (III), wherein $R^3$ is the same or different from $R^2$ and may have the definition of $R^2$, and c) aromatic vinyl compounds.

27 Claims, No Drawings

MIXTURES FOR PRODUCING TRANSPARENT PLASTICS, TRANSPARENT PLASTICS AND METHOD FOR PRODUCING THE SAME AND THE USE THEREOF

The present invention relates to mixtures for preparing transparent plastics. The present invention further relates to transparent plastics which can be prepared from the mixtures, and to a process for their preparation. The present invention also relates to the use of transparent plastics for producing optical, especially ophthalmic, lenses.

Spectacles have become an essential component of everyday life. Among these, spectacles with plastics lenses have in particular gained importance recently, because they weigh less and are less breakable than spectacle lenses composed of inorganic materials, and can be colored by means of suitable dyes. The production of plastics spectacle lenses generally uses high-transparency plastics obtainable, by way of example, from diethylene glycol bis(allyl carbonate) (DAC), thiourethane compounds having α,ω-terminated multiple bonds or sulphur-containing (meth)acrylates.

DAC plastic has very good impact strength and transparency, and good processibility. However, a disadvantage is that the relatively low refractive index $n_D$ of about 1.50 requires that both the centre and the edges of these plastics lenses be reinforced, the spectacle lenses being correspondingly thick and heavy. This markedly reduces the wearer comfort of spectacles with DAC plastics lenses.

The specification DE 4234251 discloses sulphur-containing polymethacrylates which are obtained via free-radical copolymerization of a monomer mixture composed of compounds of the formula (1) and (2)

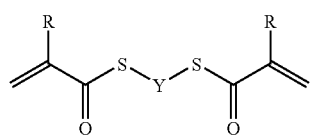

(1)

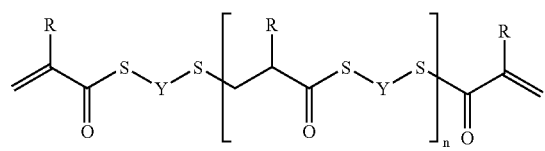

(2)

Here, Y is an unbranched or branched, acyclic or cyclic alkyl radical having from 2 to 12 carbon atoms, or an aryl radical having from 6 to 14 carbon atoms, or an alkaryl radical having from 7 to 20 carbon atoms, and the carbon chains here may have interruption by one or more ether or thioether groups. R is hydrogen or methyl and n is a whole number in the range from 1 to 6.

According to DE 4234251, the monomers of the formula (1) and (2) generally have a molar ratio of from 1:0.5 to 0.5:1. The monomer mixture is prepared via reaction of at least two mols of (meth)acryloyl chloride or (meth)acrylic anhydride with one mole of a dithiol, by reacting the (meth)acryloyl chloride or (meth)acrylic anhydride in an inert organic solvent and the dithiol in aqueous alkaline solution. Suitable solvents mentioned are methyl tert-butyl ether, toluene and xylene, the dielectric constant of these at 20° C. being 2.6, 2.4 and, respectively, from 2.3 to 2.6.

The plastics described in DE 4234251 are colorless, rigid and slightly brittle and have a high refractive index $n_D$ in the range from 1.602 to 1.608. The Abbe number is from 35 to 38. These plastics too, therefore, have only limited suitability for spectacle lenses. Again, this specification gives no information concerning the glass transition temperature of the plastics.

The specification WO 03/011925 describes the polymerization of thiomethacrylates with polyethylene glycol derivatives. The resultant plastics may be used, inter alia, for producing optical lenses. A disadvantage of these lenses is their mechanical properties. In particular, for example, impact strength is insufficient for many requirements.

In the light of the prior art, it was then an object of the present invention to provide mixtures for preparing transparent plastics which are suitable as a material for optical lenses, where the plastics have ideal mechanical properties, in particular high impact strength, together with a high refractive index, preferably greater than 1.59, and a maximum Abbe number, preferably greater than 36. In particular, it should be possible to produce plastics spectacle lenses which have a low level of dispersion and no colorings at the edges.

The present invention was also based on the object of providing a starting material composition for preparing a high-transparency plastic with improved mechanical properties, even at temperatures above room temperature. In particular, the glass transition temperature of the inventive plastic should be maximized, preferably being above 80.0° C.

It was therefore an object of the present invention to provide a high-transparency plastic which can be prepared from the starting material composition in a simple manner, on an industrial scale and at low cost. In particular, it should be obtainable via free-radical polymerization from a mixture which is flowable at atmospheric pressure and temperatures in the range from 20.0 to 80.0° C.

Another object on which the present invention was based was to provide application sectors and possible uses for the inventive high-transparency plastic.

A mixture with all of the features of patent Claim 1 achieves these objects, and also achieves other objects which, although not explicitly mentioned, are readily derivable or deducible from the circumstances discussed in the introduction. Advantageous modifications of the inventive mixture are protected in the subclaims dependent on Claim 1. Other subject matters claimed are the high-transparency plastics obtainable from the inventive mixtures, and also a process for their preparation. The use claim protects a preferred use of the inventive high-transparency plastic. Another product claim describes an optical, preferably ophthalmic, lens which comprises the inventive high-transparency plastic.

Mixtures Encompassing
a) compounds of the formula (I) and (II)

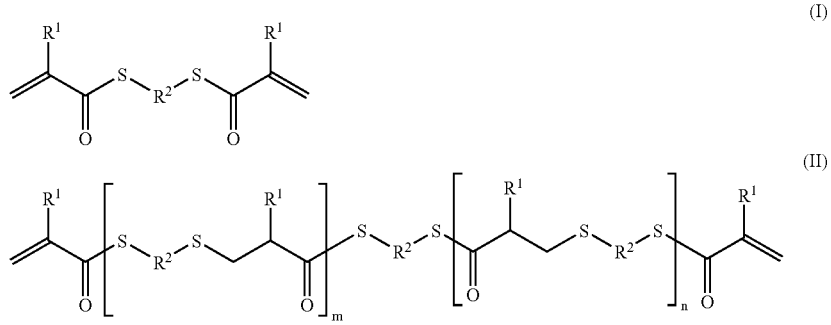

where each $R^1$, independently of the others, is hydrogen or a methyl radical,
each $R^2$, independently of the others, is a linear or branched, aliphatic or cycloaliphatic radical, or a substituted or unsubstituted aromatic or heteroaromatic radical, and each of m and n, independently of the other, is a whole number greater than or equal to 0, where m+n>0, and
b) a prepolymer prepared from polymethacrylate, preferably dimethacrylate, particularly preferably ethoxylated bisphenol(A) dimethacrylate, and from polythiols or from alkyl dithiols, preferably compounds of the formula (III)

$$HS-R^3-SH \qquad (III)$$

where $R^3$, identical with or different from $R^2$, can be as defined for $R^2$ and
c) aromatic vinyl compounds, which are suitable for preparing transparent plastics, and which have excellent mechanical and optical-properties. The mixtures may, if appropriate, comprise
d) at least one monomer (A) capable of free-radical polymerization and having at least 2 methacrylate groups, and/or
e) at least one monomer capable of free-radical polymerization and having at least two terminal olefinic groups whose reactivity differs, for example a bifunctional monomer having a methacrylate end group and a vinyl end group, and/or
f) at least one ethylenically unsaturated monomer (B), preferably from the group of the methacrylates, particularly preferably 2-hydroxyethyl methacrylate.

The inventive transparent plastic has a previously unknown combination of exceptional properties, such as high refractive index, high Abbe number, good impact strength, and also high glass transition temperature. The corresponding plastics spectacle lenses have a low level of dispersion; no coloring at the edges is observed.

The inventive transparent plastic also has further advantages. Among these are:
⇒Since the inventive plastic has high refractive index, there is no requirement for reinforcement and therefore thickening of the centre and of the edges of corresponding plastics spectacle lenses, and there is a marked increase in the wearer comfort provided by these spectacles, due to the comparatively low weight.
⇒The very good impact strength of the inventive plastic protects the corresponding plastics spectacle lenses from the "risks of everyday life". In particular in the case of thin spectacle lenses, it is very unlikely that mechanical forces will cause impairment or irreparable damage.
⇒The glass transition temperature of the inventive high-transparency plastic is high, preferably above 80.0° C., and up to this temperature the plastic therefore retains its exceptional mechanical properties, in particular high impact strength, and its hardness.
⇒The inventive high-transparency plastic can be prepared via free-radical copolymerization in a simple manner, on an industrial scale, at low cost, of a monomer mixture which is preferably flowable at atmospheric pressure and temperatures in the range from 20.0 to 80.0° C.
⇒The underlying monomer mixture can likewise be prepared in a simple manner, on an industrial scale, and at low cost.

The mixture of the present invention encompasses compounds of the formula (I) and (II)

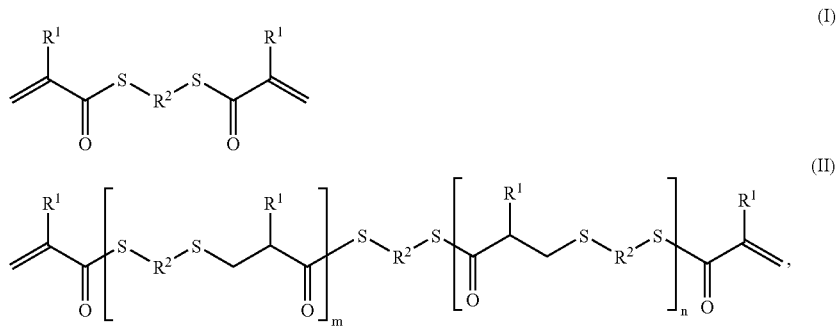

where each $R^1$, independently of the others, is hydrogen or a methyl radical, preferably a methyl radical, and each $R^2$, independently of the others, is a linear or branched, aliphatic or cycloaliphatic radical, or a substituted or unsubstituted aromatic or heteroaromatic radical, where the radical $R^2$ may preferably encompass from 1 to 100, in particular from 1 to 20, carbon atoms.

By way of example, among the preferred linear or branched, aliphatic or cycloaliphatic radicals are the methylene, ethylene, propylene, isopropylene, n-butylene, isobutylene, tert-butylene, or cyclohexylene group.

Among the preferred divalent aromatic or heteroaromatic radicals are in particular groups which derive from benzene, from naphthalene, from biphenyl, from diphenyl ether, from diphenylmethane, from diphenyldimethyl-methane, from bisphenone, from diphenyl sulphone, from quinoline, from pyridine, from anthracene, and from phenanthrene. For the purposes of the present invention, cycloaliphatic radicals here also encompass bi-, tri- and polycyclic aliphatic radicals.

The radical $R^2$ also encompasses radicals of the formula

(Ia)

where each $R^4$, independently of the others, is a linear or branched, aliphatic or cycloaliphatic radical, e.g. a methylene, ethylene, propylene, isopropylene, n-butylene, isobutylene, tert-butylene or cyclohexylene group. Each radical X, independently of the others, is oxygen or sulphur, and the radical $R^5$ is a linear or branched, aliphatic or cycloaliphatic radical, e.g. a methylene, ethylene, propylene, isopropylene, n-butylene, isobutylene, tert-butylene or cyclohexylene group. For the purposes of the present invention, cycloaliphatic radicals here also encompass bi-, tri- and polycyclic aliphatic radicals. Y is a whole number from 1 to 10, in particular 1, 2, 3 or 4.

Preferred radicals of the formula (Ia) encompass:

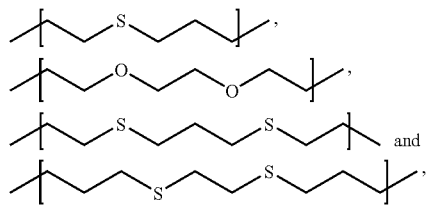

The radical $R^2$ is preferably an aliphatic radical having from 1 to 10 carbon atoms, preferably a linear aliphatic radical having from 2 to 8 carbon atoms. Each of the indices m and n, independently of the others, is a whole number greater than or equal to 0, such as 0, 1, 2, 3, 4, 5 or 6. The sum m+n here is greater than 0, preferably in the range from 1 to 6, advantageously in the range from 1 to 4, in particular 1, 2 or 3.

Each of the compounds of the formula (I), and also each of the compounds of the formula (II), may be used individually or else in the form of a mixture of two or more compounds of the formula (I) and, respectively, (II).

The relative proportions of the compounds of the formula (I) and (II) in the inventive monomer mixture may in principle be as desired, and they can be utilized to "tailor" the property profile of the inventive plastic to the demands of the application. By way of example, it can be extremely advantageous for the monomer mixture to comprise a marked excess of compound(s) of the formula (I) or compound(s) of the formula (II), based in each case on the total amount of compounds of the formula (I) and (II).

However, for the purposes of the present invention it is particularly advantageous for the mixture to comprise more than 10 mol %, preferably more than 12 mol %, in particular more than 14 mol %, based on the total amount of the compounds of the formula (I) and (II), of compounds of the formula (II) where m+n=2. If $R^2$ is an ethylene radical, the proportion by weight of (II) where m+n=2 in the mixture is more than 10%, in particular more than 15%.

It is moreover particularly advantageous according to the invention to use mixtures which comprise more than 5.8 mol %, advantageously more than 6.5 mol %, in particular more than 7.5 mol %, based on the total amount of the compounds of the formula (I) and (II), of compounds of the formula (II) where m+n=3. This corresponds to a proportion by weight of (II) of at least 6% if $R^2$ is an ethylene radical, where m+n=3.

The proportion of the compounds (I) is preferably from 0.1 to 50.0 mol %, advantageously from 10.0 to 45.0 mol %, in particular from 20.0 to 35.0 mol %, based on the total amount of the compounds of the formula (I) and (II), corresponding to a preferred range for the preparation by weight of the compound (I) of from 15 to 40% if $R^2$ is an ethylene radical. The proportion of the compounds (II) where m+n=1 is preferably from 1 to 40.0 mol %, advantageously from 5 to 35.0 mol %, in particular from 10 to 30 mol %, based on the total amount of the compounds of the formula (I) and (II). This corresponds to a preferred proportion by weight of the compounds (II) where m+n=1 of from 10 to 45% if $R^2$ is an ethylene radical. The proportion of the compounds (II) where m+n>3 is preferably greater than 0 mol %, advantageously greater than 1 mol %, in particular greater than 2 mol %, based on the total amount of the compounds of the formula (I) and (II). If $R^2$ is an ethylene radical, the proportion by weight for compounds (II) where m+n>3 in the mixture is more than 2%, in particular more than 5%.

Processes for preparing the compounds of the formula (I) and (II) are known to the person skilled in the art, for example from DE 4234251, the disclosure of which is expressly incorporated herein by way of reference. However, for the purposes of the present invention, it has proven very particularly advantageous to prepare a mixture of the compounds of the formula (I) and (II) via a process in which from 1.0 to <2.0 mol, preferably from 1.1 to 1.8 mol, advantageously from 1.2 to 1.6 mol, in particular from 1.2 to 1.5 mol, of at least one compound of the formula (IV)

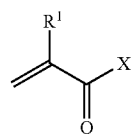

(IV)

are reacted with one mole of at least one polythiol of the formula (V)

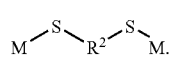

(V)

The radical X is halogen, in particular chlorine or bromine, or a radical

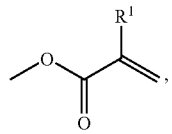

this means that the compounds of the formula (IV) encompass, inter alia, acryloyl chloride, methacryloyl chloride, acrylic anhydride and methacrylic anhydride, particular preference being given to the use of acrylic anhydride, methacrylic anhydride or mixtures of the two.

Each M indicates, independently of the other, hydrogen or a metal cation. Preferred metal cations derive from elements whose electronegativity is smaller than 2.0, advantageously smaller than 1.5, particular preference being given to alkali metal cations, in particular $Na^+$, $K^+$, $Rb^+$, $Cs^+$ and alkaline earth metal cations, in particular $Mg^{2+}$, $Ca^{2+}$, $Sr^{2+}$, $Ba^{2+}$. Very particularly advantageous results may be achieved using the metal cations $Na^+$ and $K^+$.

Polythiols of the formula (V) particularly suitable in this context encompass 1,2-ethanedithiol, 1,2-propanedithiol, 1,3-propanedithiol, 1,2-butanedithiol, 1,3-butanedithiol, 1,4-butanedithiol, 2-methylpropane-1,2-dithiol, 2-methylpropane-1,3-dithiol, 3,6-dioxa-1,8-octanedithiol (dimercaptodioxaoctane=DMDO), ethylcyclohexyl dimercaptans obtainable via reaction of 4-ethenylcyclohexene with hydrogen sulphite, ortho-bis(mercaptomethyl)benzene, meta-bis(mercaptomethyl)benzene, para-bis(mercaptomethyl)benzene, compounds of the formula (V)

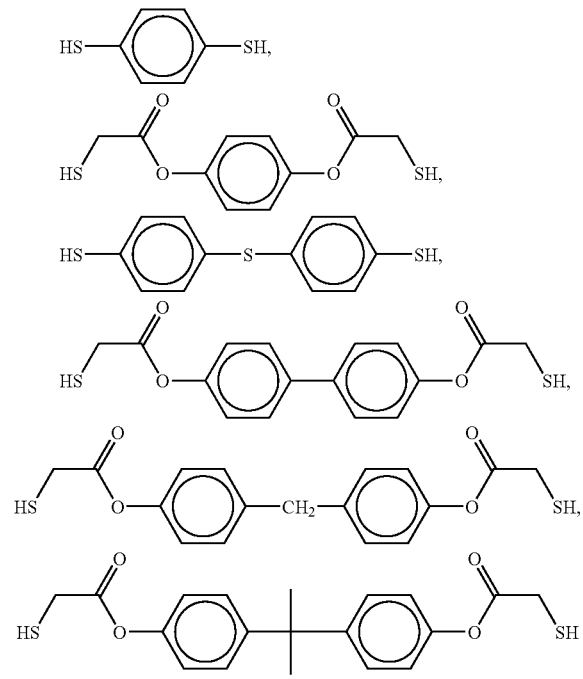

and also compounds of the formula

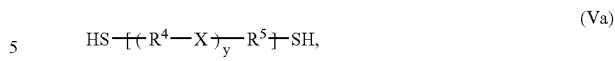

where each $R^4$, independently of the others, is a linear or branched, aliphatic or cycloaliphatic radical, such as a methylene, ethylene, propylene, isopropylene, n-butylene, isobutylene, tert-butylene or cyclohexylene group. For the purposes of the present invention, cycloaliphatic radicals here also encompass bi-, tri- and polycyclic aliphatic radicals. Each radical X, independently of the others, is oxygen or sulphur, and the radical $R^5$ is a linear or branched, aliphatic or cycloaliphatic radical, such as a methylene, ethylene, propylene, isopropylene, n-butylene, isobutylene, tert-butylene or cyclohexylene group. For the purposes of the present invention, cycloaliphatic radicals here also encompass bi-, tri- and polycyclic aliphatic radicals. y is a whole number from 1 to 10, in particular 1, 2, 3 or 4.

Preferred compounds of the formula (Va) encompass:

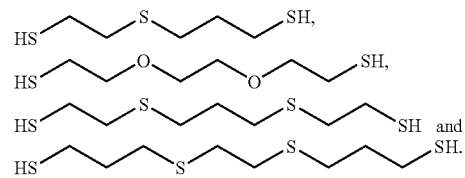

For the purposes of one particularly preferred embodiment of this process, the compound used of the formula (V) comprises 1,2-ethanedithiol.

This process reacts the compound(s) of the formula (IV) in at least one inert, organic solvent S, and the compound(s) of the formula (V) in aqueous alkaline solution, the expression "inert, organic solvent" applying to organic solvents which do not react with the compounds present in the reaction system under the respective reaction conditions.

It is preferable for at least one solvent S to have a relative dielectric constant >2.6, preferably >3.0, advantageously >4.0, in particular >5.0, in each case measured at 20° C. In this context, the relative dielectric constant indicates a dimensionless value stating the factor by which the capacitance C of a (theoretical) capacitor located within a vacuum increases when substances with dielectric properties, known as dielectrics, are introduced between the plates. This value is measured at 20° C. and extrapolated to low frequencies ($\omega \rightarrow 0$). For further details reference is made to the familiar technical literature, in particular to Ullmann Encyklopädie der technischen Chemie, [Ullmann's Encyclopaedia of Industrial Chemistry] Volume 2/1 Anwendung physikalischer und physikalisch-chemischer Methoden im Laboratorium [Application of physical and physico-chemical methods in the laboratory], headword: Dielektrizitätskonstante [Dielectric constant], pp. 455-479. Dielectric values of solvents are given, inter alia, in Handbook of Chemistry and Physics, 71st edition, CRC Press, Baco Raton, Ann Arbor, Boston, 1990-1991, pp. 8-44, 8-46 and 9-9 to 9-12.

For the purposes of this process it is moreover particularly advantageous for the solvent and the aqueous solution to form two phases during the reaction and not to be capable of homogeneous mixing. To this end, the water solubility value for the solvent, measured at 20° C., is preferably smaller than 10 g of water, based on 100 g of solvent.

Solvents S preferred according to the invention encompass aliphatic ethers, such as diethyl ether (4.335), dipropyl ether, diisopropyl ether;

cycloaliphatic ethers, such as tetrahydrofuran (7.6);

aliphatic esters, such as methyl formate (8.5), ethyl formate, propyl formate, methyl acetate, ethyl acetate, n-butyl acetate (5.01), methyl propionate, methyl butyrate (5.6), ethyl butyrate, 2-methoxyethyl acetate;

aromatic esters, such as benzyl acetate, dimethyl phthalate, methyl benzoate (6.59), ethyl benzoate (6.02), methyl salicylate, ethyl salicylate, phenyl acetate (5.23);

aliphatic ketones, such as acetone, methyl ethyl ketone (18.5), 2-pentanone (15.4), 3-pentanone (17.0), methyl isoamyl ketone, methyl isobutyl ketone (13.1);

aromatic ketones, such as acetophenone;

nitroaromatics, such as nitrobenzene, o-nitrotoluene (27.4), m-nitrotoluene (23), p-nitrotoluene;

halogenated aromatics, such as chlorobenzene (5.708), o-chlorotoluene (4.45), m-chlorotoluene (5.55), p-chlorotoluene (6.08), o-dichlorobenzene, m-dichlorobenzene;

heteroaromatics, such as pyridine, 2-methylpyridine (9.8), quinoline, isoquinoline; and mixtures of these compounds, the data in brackets being the respective associated relative dielectric constants at 20° C.

Compounds very particularly suitable here for the purposes of the present invention are aliphatic esters and cycloaliphatic ethers, in particular ethyl acetate and tetrahydrofuran.

For the purposes of the present process, it is possible either to use the solvent S alone or else to use a solvent mixture, in which case it is not necessary that all of the solvents present in the mixture comply with the abovementioned dielectric criterion. By way of example, according to the invention it is also possible to use tetrahydrofuran/cyclohexane mixtures. However, it has proven advantageous for the solvent mixture to have a relative dielectric constant >2.6, preferably >3.0, advantageously >4.0, in particular >5.0, in each case measured at 20° C. Particularly advantageous results can be achieved using solvent mixtures which comprise only solvents whose relative dielectric constant is >2.6, preferably >3.0, advantageously >4.0, in particular >5.0, in each case measured at 20° C.

The aqueous alkaline solution of the compound(s) of the formula (V) preferably comprises from 1.1 to 1.5 val (equivalents) of at least one Bronsted base, based on the total amount of compound(s) of the formula (IV). Preferred Bronsted bases for the purposes of the present invention encompass alkali metal hydroxides and alkaline earth metal hydroxides, in particular sodium hydroxide and potassium hydroxide.

In principle, any conceivable method may be used for the conduct of the reaction. By way of example, the compound(s) of the formula (IV) may form an initial charge in the solvent (mixture) S, and the aqueous alkaline solution of the compound(s) of the formula (V) may be added stepwise or continuously. However, for the purposes of the present invention it has proven very particularly advantageous to meter the compound(s) of the formula (IV) in at least one inert, organic solvent S and the compound(s) of the formula (V) in aqueous alkaline solution to the reaction vessel in parallel.

The reaction temperature may be varied widely, but the temperature is often in the range from 20.0 to 120.0° C., preferably in the range from 20.0 to 80.0° C. Similar considerations apply for the pressure at which the reaction is completed. The reaction may therefore take place either at subatmospheric pressure or else at superatmospheric pressure. However, it is preferably carried out at atmospheric pressure. Although the reaction can also take place in air, it has proven very particularly advantageous for the purposes of the present invention to carry out the reaction under an inert gas, preferably nitrogen and/or argon, preferably with a very small proportion of oxygen present.

The reaction mixture is advantageously reacted in a further step with a Bronsted acid, preferably until the pH of the aqueous solution at 20° C. is below 7.0, advantageously below 6.0, in particular below 5.0. Acids which may be used in this context encompass inorganic mineral acids, such as hydrochloric acid, sulphuric acid, phosphoric acid, organic acids, such as acetic acid, propionic acid, and acidic ion exchangers, in particular acidic synthetic resin ion exchangers, e.g. ®Dowex M-31 (H). The method which has proven very particularly successful here is the use of acidic synthetic resin ion exchangers loaded with at least 1.0 meq, preferably at least 2.0 meq, in particular at least 4.0 meq, of $H^+$ ions, based on 1 g of dry ion exchanger, grain sizes of from 10 to 50 mesh and porosities in the range from 10 to 50%, based on the total volume of the ion exchanger.

In an advantageous method for isolating the compounds of the formula (I) and (II) the organic phase composed of the solvent S is separated off and, where appropriate, washed, and dried, and the solvent is evaporated.

During the reaction of the compound(s) of the formula (IV) with the compound(s) of the formula (V) it is possible to add inhibitors which inhibit free-radical polymerization of the (meth)acrylic groups during the reaction. These inhibitors are well-known to persons skilled in the art.

Use is mainly made of 1,4-dihydroxybenzenes. However, it is also possible to use dihydroxybenzenes having other substitution. These inhibitors can generally be represented by the general formula (VI)

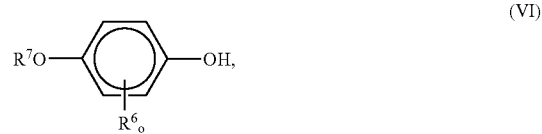

(VI)

where $R^6$ is a linear or branched alkyl radical having from one to eight carbon atoms, halogen or aryl, preferably an alkyl radical having from one to four carbon atoms, particularly preferably methyl, ethyl, n-propyl, isopropyl, n-butyl, isobutyl, sec-butyl, tert-butyl, Cl, F or Br;

o is a whole number in the range from one to four, preferably one or two; and $R^7$ is hydrogen, a linear or branched alkyl radical having from one to eight carbon atoms, or aryl, preferably an alkyl radical having from one to four carbon atoms, particularly preferably methyl, ethyl, n-propyl, isopropyl, n-butyl, isobutyl, sec-butyl or tert-butyl.

However, it is also possible to use compounds whose parent compound is 1,4-benzoquinone. These may be described by the formula (VII)

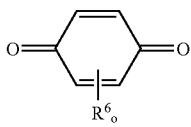

where

R⁶ and o are as defined above.

Use is also made of phenols of the general structure (VIII)

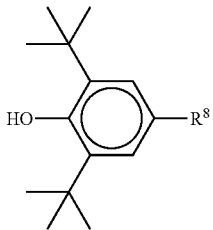

where $R^8$ is a linear or branched alkyl radical having from one to eight carbon atoms, aryl or aralkyl, propionic esters with mono- to tetrahydric alcohols, which may also contain heteroatoms, such as S, O and N, preferably an alkyl radical having from 1 to 4 carbon atoms, particularly preferably methyl, ethyl, n-propyl, isopropyl, n-butyl, isobutyl, sec-butyl, tert-butyl.

Another advantageous class of substance is represented by hindered phenols based on triazine derivatives of the formula (IX)

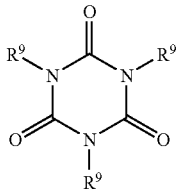

where $R^9$=a grouping of the formula (X)

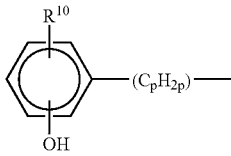

where $R^{10}=C_pH_{2p+1}$ where p=1 or 2.

Compounds used with particular success are 1,4-dihydroxybenzene, 4-methoxyphenol, 2,5-dichloro-3,6-dihydroxy-1,4-benzoquinone, 1,3,5-trimethyl-2,4,6-tris(3,5-di-tert-butyl-4-hydroxybenzyl)benzene, 2,6-ditert-butyl-4-methylphenol, 2,4-dimethyl-6-tert-butylphenol, 2,2-bis[3,5-bis(1,1-dimethylethyl)-4-hydroxyphenyl-1-oxopropoxymethyl)]1,3-propanediyl ester, 2,2'-thiodiethyl bis[3-(3,5-di-tert-butyl-4-hydroxyphenyl)propionate], octadecyl 3-(3,5-di-tert-butyl-4-hydroxyphenyl)propionate, 3,5-bis(1,1-dimethylethyl-2,2'-methylenebis(4-methyl-6-tert-butyl)phenol, tris(4-tert-butyl-3-hydroxy-2,6-dimethylbenzyl)-s-triazine-2,4,6-(1H,3H,5H)trione, tris(3,5-di-tert-butyl-4-hydroxy)-s-triazine-2,4,6-(1H,3H,5H) trione or tert-butyl-3,5-dihydroxybenzene.

Based on the weight of the entire reaction mixture, the proportion of the inhibitors individually or in the form of a mixture is generally from 0.01 to 0.50% (by weight), the concentration of the inhibitors preferably being selected in such a way as not to impair the DIN 55945 color number. Many of these inhibitors are commercially available.

For the purposes of the present invention, the mixture also comprises, alongside the compounds of the formula (I) and (II), at least one prepolymer prepared from polymethacrylate and from polythiols or from alkyl dithiols.

For preparation of the prepolymer, it is preferable to use suitable polythiols or alkyl dithiols, preferably compounds of the formula (III)

$$HS-R^3-SH \qquad (III)$$

in which the radical $R^3$ can be as defined for $R^2$ and, in each case independently of $R^2$, is a linear or branched, aliphatic or cycloaliphatic radical or a substituted or unsubstituted aromatic or heteroaromatic radical, where the radical $R^3$ can preferably encompass from 1 to 100 carbon atoms, in particular from 1 to 20.

The proportion of the compounds (III) in the prepolymer is preferably from 1 to 55.0 mol %, in particular from 10.0 to 50.0 mol %, based on the total amount of the prepolymer. If in a specific case $R^3$ is a dimercaptodioxaoctane radical, the proportion by weight of (III) in the prepolymer, based on the total amount, is more than 0.5%, preferably more than 5%.

For preparation of the prepolymer, polymethacrylates are used, preferably dimethacrylates, particularly preferably ethoxylated bisphenol A di(meth)acrylate.

Examples of these di(meth)acrylates are polyoxyethylene-(meth)acrylic acid derivatives and polyoxypropylene-(meth) acrylic acid derivatives, e.g. triethylene glycol(meth)acrylate, tetraethylene glycol(meth)acrylate, tetrapropylene glycol (meth)acrylate, and also 1,4-butanediol di(meth)acrylate, diethylene glycol di(meth)acrylate, dipropylene glycol di(meth)acrylate, triethylene glycol di(meth)acrylate, tripropylene glycol di(meth)acrylate. Tetraethylene glycol di(meth)acrylate, tetrapropylene glycol di(meth)acrylate, polyethylene glycol di(meth)acrylate (preferably having weight-average molar masses in the range from 200 to 5 000 000 g/mol, advantageously in the range from 200 to 25 000 g/mol, in particular in the range from 200 to 1000 g/mol), polypropylene glycol di(meth)acrylate (preferably with weight-average molar masses in the range from 200 to 5 000 000 g/mol, advantageously in the range from 250 to 4000 g/mol, in particular in the range from 250 to 1000 g/mol), 2,2'-thiodiethanol di(meth)acrylate (thiodiglycol di(meth) acrylate), 3,9-di(meth)acryloyloxymethyltricyclo[5.2.1.0(2.6)]-decane, in particular

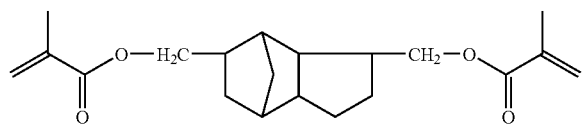

3,8-di(meth)acryloyloymethyltricyclo[5.2.1.0(2.6)]-decane
4,8-di(meth)acryloyloymethyltricyclo[5.2.1.0(2.6)]-decane,
4,9-di(meth)acryloyloymethyltricyclo[5.2.1.0(2.6)]-decane,
ethoxylated bisphenol A di(meth)acrylate, in particular

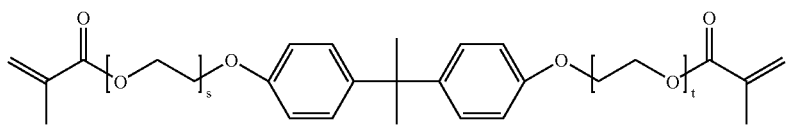

where s and t are greater than or equal to zero, and the sum of s and t is preferably in the range from 1 to 30, in particular in the range from 2 to 10, and di(meth)acrylates obtainable via reaction of diisocyanates with 2 equivalents of hydroxyalkyl (meth)acrylate, in particular

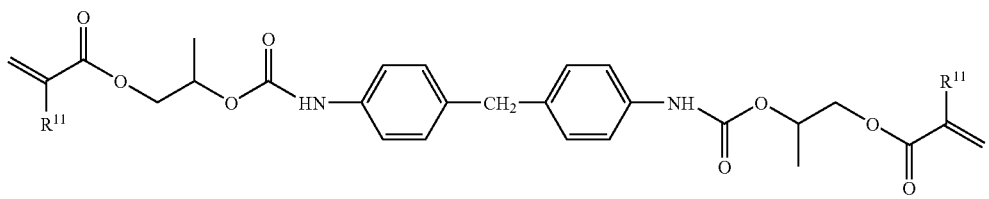

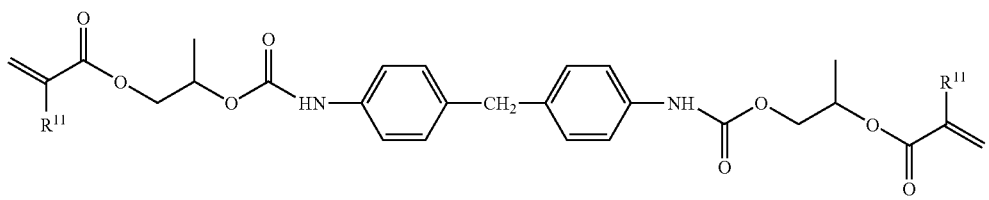

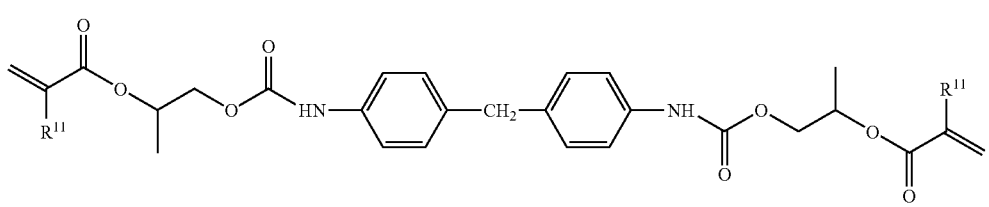

where each radical $R^{11}$, independently of the others, is hydrogen or a methyl radical, tri(meth)acrylates, such as trimethylolpropane tri(meth)acrylate and glycerol tri(meth)acrylate, or else (meth)acrylates of ethoxylated or propoxylated glycerol, of trimethylolpropane, or of other alcohols having more than 2 hydroxy groups.

For the purposes of the present invention, the mixture also comprises an aromatic vinyl compound, alongside compounds of the formula (I) and (II) and alongside at least one prepolymer prepared from polymethacrylate and from polythiols or from alkyl dithiols.

Among the aromatic vinyl compounds it is preferable to use styrenes, substituted styrenes having an alkyl substitutent in the side chain, e.g. α-methyl-styrene and α-ethylstyrene, substituted styrenes having an alkyl substitutent on the ring, e.g. vinyltoluene and p-methylstyrene, halogenated styrenes, e.g. monochlorostyrenes, dichlorostyrenes, tribromostyrenes and tetrabromostyrenes and also dienes, e.g. 1,2-divinylbenzene, 1,3-divinylbenzene, 1,4-divinylbenzene, 1,2-diisopropenylbenzene, 1,3-diisopropenylbenzene and 1,4-diisopropenylbenzene.

The proportion of the aromatic vinyl compounds is from 5-40% by weight, preferably from 10-30% by weight, particularly preferably from 15-25% by weight, based on the total amount of the compounds of the formula (I) and (II), of the prepolymer, and also of the aromatic vinyl compounds and of other monomers optionally used.

Surprisingly, addition of the aromatic vinyl compounds improves the mechanical properties of the inventive plastics material without adversely affecting its optical properties. In many instances, a favourable effect on optical properties is found.

Di(meth)acrylates of the formula (XI) have proven particularly successful as monomer (A).

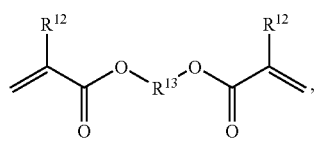
(XI)

Each $R^{12}$ here, independently of the others, is hydrogen or methyl. $R^{13}$ indicates a linear or branched alkyl or cycloalkyl radical, or an aromatic radical preferably having from 1 to 100, with preference from 1 to 40, preferably from 1 to 20, advantageously from 1 to 8, in particular from 1 to 6, carbon atoms, e.g. a methyl, ethyl, propyl, isopropyl, n-butyl, isobutyl, tert-butyl, cyclopentyl, cyclohexyl, or phenyl group. For the purposes of the present invention, cycloaliphatic radicals here also encompass bi-, tri-, and polycyclic aliphatic radicals. Linear or branched alkyl or cycloalkyl radicals having from 1 to 6 carbon atoms are very particularly preferred as $R^{18}$.

The radical $R^{13}$ is preferably a linear or branched, aliphatic or cycloaliphatic radical, such as a methylene, ethylene, propylene, isopropylene, n-butylene, isobutylene, tert-butylene or cyclohexylene group, or a radical of the general formula

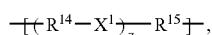
(XIa)

where the radical $R^{15}$ is a linear or branched, aliphatic or cycloaliphatic radical, or a substituted or unsubstituted aromatic or heteroaromatic radical, e.g. a methylene, ethylene, propylene, isopropylene, n-butylene, isobutylene, tert-butylene or cyclohexylene group, or divalent aromatic or heteroaromatic groups which derive from benzene, from naphthalene, from biphenyl, from diphenyl ether, from diphenylmethane, from diphenyldimethylmethane, from bisphenone, from diphenyl sulphone, from quinoline, from pyridine, from anthracene, or from phenanthrene. For the purposes of the present invention, cycloaliphatic radicals here also encompass bi-, tri- and polycyclic aliphatic radicals. Each radical $R^{14}$, independently of the others, is a linear or branched, aliphatic or cycloaliphatic radical or a substituted or unsubstituted aromatic or heteroaromatic radical, e.g. a methylene, ethylene, propylene, isopropylene, n-butylene, isobutylene, tert-butylene or cyclohexylene group, or divalent aromatic or heteroaromatic groups which derive from benzene, from naphthalene, from biphenyl, from diphenyl ether, from diphenylmethane, from diphenyldimethylmethane, from bisphenone, from diphenyl sulphone, from quinoline, from pyridine, from anthracene, or from phenanthrene. For the purposes of the present invention, cycloaliphatic radicals here also encompass bi-, tri- and polycyclic aliphatic radicals. Each radical $X^{I}$, independently of the others, is oxygen, sulphur, an ester group of the general formula (XIb), (XIc),

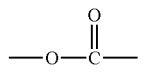
(XIb)

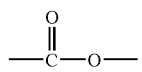
(XIc)

a urethane group of the general formula (XId), (XIe), (XIf) or (XIg),

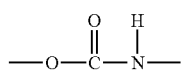
(XId)

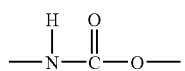
(XIe)

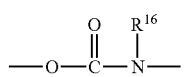
(XIf)

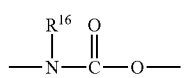
(XIg)

a thiourethane group of the general formula (XIh), (XIi), (XIj) or (XIk),

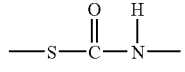
(XIh)

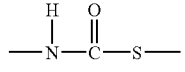
(XIi)

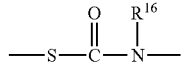
(XIj)

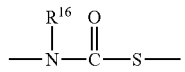
(XVk)

a dithiourethane group of the general formula (XIl), (XIm), (XIn) or (XIo)

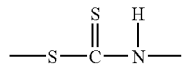 (XIl)

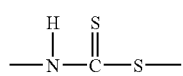 (XIm)

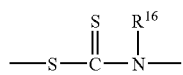 (XIn)

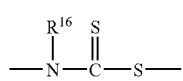 (XIo)

a thiocarbamate group of the general formula (XIp), (XIq), (XIr) or (XIs)

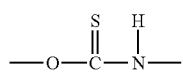 (XIp)

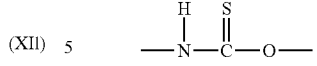 (XIq)

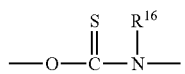 (XIr)

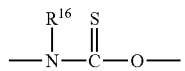 (XIs)

preferably oxygen, where the radical $R^{16}$ is a linear or branched, aliphatic or cycloaliphatic radical or a substituted or unsubstituted aromatic or heteroaromatic radical, e.g. a methyl, ethyl, propyl, isopropyl, n-butyl, isobutyl, tert-butyl or cyclohexyl group, or monovalent aromatic or heteroaromatic groups derived from benzene, from naphthalene, from biphenyl, from diphenyl ether, from diphenylmethane, from diphenyldimethylmethane, from bisphenone, from diphenyl sulphone, from quinoline, from pyridine, from anthracene, or from phenanthrene. For the purposes of the present invention, cycloaliphatic radicals here also encompass bi-, tri- and polycyclic aliphatic radicals. z is a whole number from 1 to 1000, advantageously from 1 to 100, in particular from 1 to 25.

Particularly preferred di(meth)acrylates of the formula (XI) encompass ethylene glycol di(meth)acrylate, ethoxylated bisphenol A di(meth)acrylate, in particular

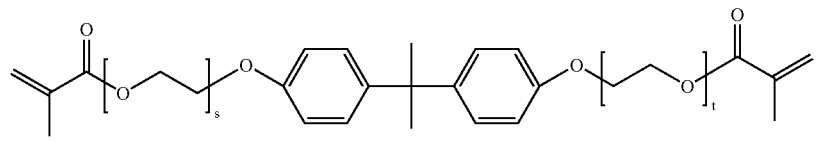

where s and t are greater than or equal to zero and the sum of s and t is preferably in the range from 1 to 20, in particular in the range from 2 to 10, and di(meth)acrylates obtainable via reaction of diisocyanates with 2 equivalents of hydroxyalkyl (meth)acrylate, in particular

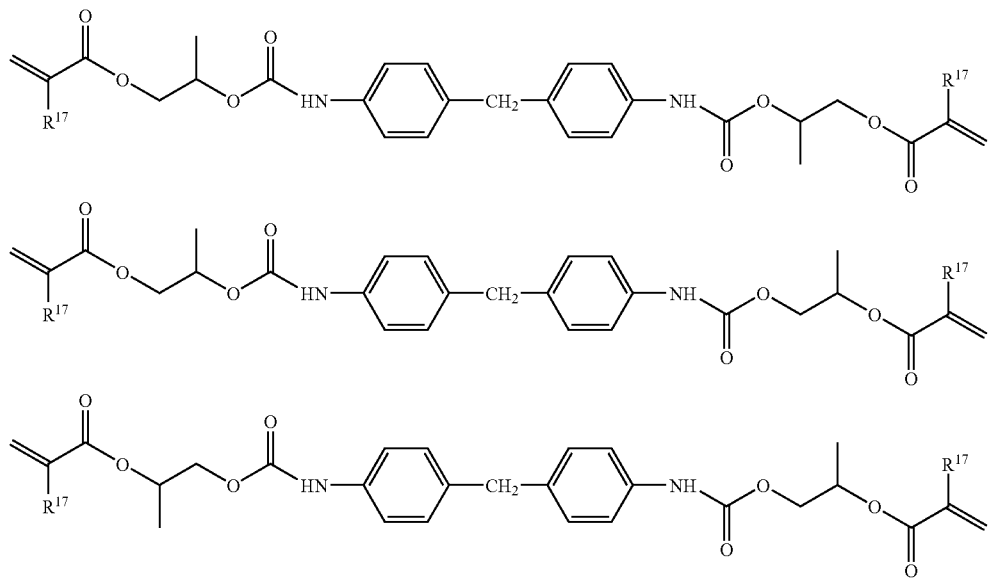

where each radical $R^{17}$, independently of the others, is hydrogen or a methyl radical,
3,8-di(meth)acryloyloxymethyltricyclo[5.2.1.0(2.6)]-decane,
3,9-di(meth)acryloyloxymethyltricyclo[5.2.1.0(2.6)]-decane,
4,8-di(meth)acryloyloxymethyltricyclo[5.2.1.0 (2.6)]-decane,
4,9-di(meth)acryloyloxymethyltricyclo[5.2.1.0(2.6)]-decane, thiodiglycol di(meth)acrylate, polypropylene glycol di(meth)acrylate, preferably with a weight-average molar mass in the range from 200 to 1000 g/mol, and/or polyethylene glycol di(meth)acrylate, preferably with a weight-average molar mass in the range from 200 to 1000 g/mol. Particular preference is given here to the dimethacrylates of the compounds mentioned. Very particularly advantageous results are achieved using polyethylene glycol dimethacrylate, preferably with a weight-average molar mass in the range from 200 to 1000 g/mol.

The proportion of monomer (A) is from 2 to 50% by weight, in particular from 10 to 30% by weight, based on all of the monomers used in the mixture.

For the purposes of the present invention, the mixture also comprises an aromatic vinyl compound, alongside compounds of the formula (I) and (II), and alongside at least one prepolymer prepared from polymethacrylate and from polythiols or from alkyl dithiols.

Among the aromatic vinyl compounds, preference is given to the use of styrenes, substituted styrenes having an alkyl substitutent in the side chain, e.g. α-methylstyrene and α-ethylstyrene, substituted styrenes having an alkyl substitutent on the ring, e.g. vinyltoluene and p-methylstyrene, halogenated styrenes, such as monochlorostyrenes, dichlorostyrenes, tribromostyrenes, and tetrabromostyrenes, and also to dienes, such as 1,2-divinylbenzene, 1,3-divinylbenzene, 1,4-divinylbenzene, 1,2-diisopropenylbenzene, 1,3-diisopropenylbenzene, and 1,4-diisopropenylbenzene.

The proportion of the aromatic vinyl compounds is from 5 to 40% by weight, preferably from 10 to 30% by weight, particularly preferably from 15 to 25% by weight, based on the total amount of the compounds of the formula (I) and (II), the prepolymer, and the aromatic vinyl compounds and other monomers optionally used.

Surprisingly, the addition of the aromatic vinyl compound improves the mechanical properties of the inventive plastics material without adversely affecting its optical properties. In many instances, a favourable effect on optical properties is found.

According to one particular aspect of the present invention, other monomers (A) capable of free-radical polymerization and having at least 2 methacrylate groups can be added if appropriate. The monomers (A) here can be as defined for the polymethacrylates under b).

According to another particular aspect of the present invention, compounds, preferably molecules having a linear structure and varying chain lengths (asymmetric crosslinking agents) of the general formula (XII) may be present

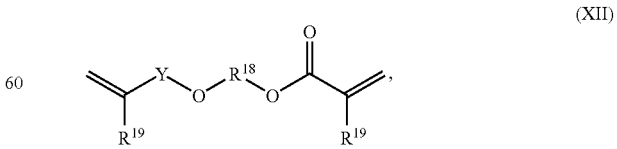

where the radical $R^{19}$ is independently a hydrogen atom, a fluorine atom and/or a methyl group, the radical $R^{18}$ is a connecting group, preferably encompassing from 1 to 1000, in particular from 2 to 100, carbon atoms and the radical Y is a bond or a connecting group having from 0 to 1000 carbon atoms, in particular from 1 to 1000 carbon atoms, and preferably from 1 to 100 carbon atoms. The length of the molecule can be varied by way of the molecular component $R^{18}$. Compounds of the formula (XII) have, at one end of the molecule, a terminal (meth)acrylate function, and at the other end have a terminal group other than a methacrylate function. Among the preferred groups Y are in particular a bond (vinyl group), a $CH_2$ group (allyl group), and also aliphatic or aromatic groups having from 1 to 20 carbon atoms, for example a benzene-derived group, the aliphatic or aromatic groups particularly preferably containing a urethane group.

The radical $R^{18}$ is preferably a linear or branched, aliphatic or cycloaliphatic radical, such as a methylene, ethylene, propylene, isopropylene, n-butylene, isobutylene, tert-butylene or cyclohexylene group, or a radical of the general formula

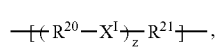                                                     (XIIa)

where the radical $R^{21}$ is a linear or branched, aliphatic or cycloaliphatic radical or a substituted or unsubstituted aromatic or heteroaromatic radical, e.g. a methylene, ethylene, propylene, isopropylene, n-butylene, isobutylene, tert-butylene or cyclohexylene group, or divalent aromatic or heteroaromatic groups which derive from benzene, from naphthalene, from biphenyl, from diphenyl ether, from diphenylmethane, from diphenyldimethylmethane, from bisphenone, from diphenyl sulphone, from quinoline, from pyridine, from anthracene or from phenanthrene. For the purposes of the present invention, cycloaliphatic radicals here also encompass bi-, tri- and polycyclic aliphatic radicals. Each radical $R^{20}$ here, independently of the others, is a linear or branched, aliphatic or cycloaliphatic radical or a substituted or unsubstituted aromatic or heteroaromatic radical, e.g. a methylene, ethylene, propylene, isopropylene, n-butylene, isobutylene, tert-butylene or cyclohexylene group, or divalent aromatic or heteroaromatic groups which derive from benzene, from naphthalene, from biphenyl, from diphenyl ether, from diphenylmethane, from diphenyldimethylmethane, from bisphenone, from diphenyl sulphone, from quinoline, from pyridine, from anthracene or from phenanthrene. For the purposes of the present invention, cycloaliphatic radicals here also encompass bi-, tri- and polycyclic aliphatic radicals. Each radical $X^1$, independently of the others, is oxygen, sulphur, an ester group of the general formula (XIIb), (XIIc),

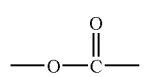                                                     (XIIb)

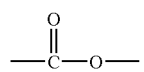                                                     (XIIc)

a urethane group of the general formula (XIId), (XIIe), (XIIf) or (XIIg),

                                                     (XIId)

                                                     (XIIe)

                                                     (XIIf)

                                                     (XIIg)

a thiourethane group of the general formula (XIIh), (XIIi), (XIIj) or (XIIk),

                                                     (XIIh)

                                                     (XIIi)

                                                    (XIIj)

                                                    (XIIk)

a dithiourethane group of the general formula (XIII), (XIIm), (XIIn) or (XIIo)

                                                    (XIII)

                                                    (XIIm)

                                                    (XIIn)

                                                    (XIIo)

or a thiocarbamate group of the general formula (XIIp), (XIIq), (XIIr) or (XIIs)

                                                    (XIIp)

                                                    (XIIq)

-continued

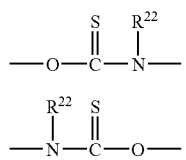
(XIIr)

(XIIs)

preferably oxygen, where the radical $R^{22}$ is a linear or branched, aliphatic or cycloaliphatic radical or a substituted or unsubstituted aromatic or heteroaromatic radical, e.g. a methyl, ethyl, propyl, isopropyl, n-butyl, isobutyl, tert-butyl or cyclohexyl group, or monovalent aromatic or heteroaromatic groups derived from benzene, from naphthalene, from biphenyl, from diphenyl ether, from diphenylmethane, from diphenyldimethylmethane, from bisphenone, from diphenyl sulphone, from quinoline, from pyridine, from anthracene, or from phenanthrene. For the purposes of the present invention, cycloaliphatic radicals here also encompass bi-, tri- and polycyclic aliphatic radicals. z is a whole number from 1 to 1000, advantageously from 1 to 100, in particular from 1 to 25.

In one particular embodiment of the formula (XII) the compounds comprise those of the formula (XIII)

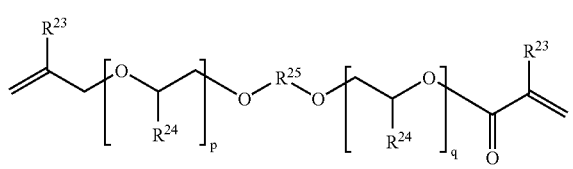
(XIII)

and/or of the formula (XIV),

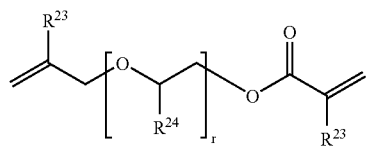
(XIV)

where each of the radicals $R^{23}$ and $R^{24}$, independently of the other, is hydrogen or a methyl radical, and the radical $R^{25}$ is a linear or branched, aliphatic or cycloaliphatic divalent radical, or a substituted or unsubstituted aromatic or heteroaromatic divalent radical. Preferred radicals have been described above.

The length of the chain may be influenced via variation of the number of polyalkylene oxide units, preferably polyethylene glycol units. Compounds of the formula (XIII) and (XIV) which have proven particularly suitable for the method described here of achieving the object have numbers of polyoxyalkylene oxide units r, p and q which are, independently of the others, from 1 to 40, preferably from 5 to 20, in particular from 7 to 15 and particularly preferably from 8 to 12.

Asymmetric crosslinking agents which are very particularly preferred according to the invention encompass compounds of the formula (XIV), in particular

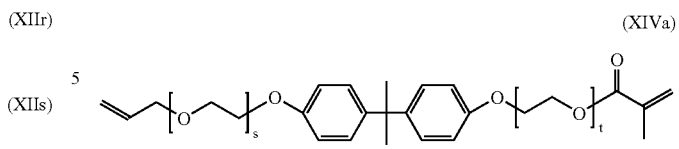
(XIVa)

where s and t are greater than or equal to zero and the sum s+t is preferably in the range from 1 to 20, in particular in the range from 2 to 10, and compounds of the formula (XIII), in particular

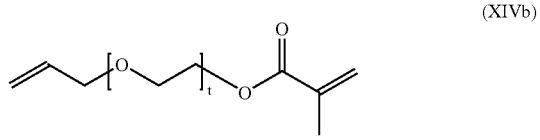
(XIVb)

where t is greater than or equal to zero and t is preferably in the range from 1 to 20, in particular in the range from 2 to 10.

According to one particular aspect, the mixture preferably comprises from 0.5 to 40% by weight, in particular from 5 to 15% by weight, of compounds of the formula (XII) and/or (XIII), based on the total weight of the monomer mixture.

For the purposes of one particularly preferred embodiment of the present invention, the inventive mixture also comprises at least one ethylenically unsaturated monomer (B). These monomers (B) differ from the asymmetric compounds of the formulae (XIII) and (XIV), and from the monomers (A) and the thio(meth)acrylates of the formulae (I) and/or (II). The monomers (B) are known to persons skilled in the art and are preferably copolymerizable with the monomers (A) and the thio(meth)acrylates of the formulae (I) and/or (II). Among these monomers (B) are in particular nitriles of (meth)acrylic acid and other nitrogen-containing methacrylates, such as methacryloylamido-acetonitrile, 2-methacryloyloxyethylmethylcyanamide, cyanomethyl methacrylate;

(meth)acrylates which derive from saturated alcohols, e.g. methyl (meth)acrylate, ethyl (meth)acrylate, n-propyl (meth) acrylate, isopropyl (meth)acrylate, n-butyl (meth)acrylate, sec-butyl (meth)acrylate, tert-butyl (meth)acrylate, pentyl (meth)acrylate, hexyl (meth)acrylate, heptyl (meth)acrylate, 2-ethylhexyl (meth)acrylate, octyl (meth)acrylate, nonyl (meth)acrylate, isooctyl (meth)acrylate, isononyl (meth) acrylate, 2-tert-butylheptyl (meth)acrylate, 3-iospropylheptyl (meth)acrylate, decyl (meth)acrylate, undecyl (meth)acrylate, 5-methylundecyl (meth)acrylate, dodecyl (meth) acrylate, 2-methyldodecyl (meth)acrylate, tridecyl (meth) acrylate, 5-methyltridecyl (meth)acrylate, tetradecyl (meth) acrylate, pentadecyl (meth)acrylate, hexadecyl (meth) acrylate, 2-methylhexadecyl (meth)acrylate, heptadecyl (meth)acrylate, 5-isopropylheptadecyl(meth)acrylate, 4-tert-butyloctadecyl (meth)acrylate, 5-ethyloctadecyl (meth)acrylate, 3-isopropyloctadecyl (meth)acrylate, octadecyl (meth) acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth) acrylate;

cycloalkyl (meth)acrylate, such as cyclopentyl (meth)acrylate, cyclohexyl (meth)acrylate, 3-vinyl-2-butylcyclohexyl (meth)acrylate and bornyl (meth)acrylate;

(meth)acrylates which derive from unsaturated alcohols e.g. 2-propynyl (meth)acrylate, allyl (meth)acrylate, and oleyl (meth)acrylate, vinyl (meth)acrylate;

The mixtures may, if appropriate, comprise d) a monomer capable of free-radical polymerization and having at least two terminal olefinic groups whose reactivity differs, for example a bifunctional monomer having a methacrylate end group and a vinyl end group, and/or e) at least one ethylenically unsaturated monomer (B), preferably from the group of the methacrylates, particularly preferably 2-hydroxyethyl methacrylate.

aminoalkyl (meth)acrylates, such as tris(2-methacryloxyethyl)amine, N-methylformamidoethyl (meth)acrylate, 2-ureidoethyl (meth)acrylate;

carbonyl-containing (meth)acrylates, such as 2-carboxyethyl (meth)acrylate, carboxymethyl (meth)acrylate, oxazolidinylethyl (meth)acrylate, N-(methacryloyloxy)formamide, acetonyl (meth)acrylate, N-methacryloylmorpholine, N-methacryloyl-2-pyrrolidinone;

(meth)acrylates of ether alcohols, e.g. tetrahydrofurfuryl (meth)acrylate, vinyloxyethoxyethyl (meth)acrylate, methoxyethoxyethyl (meth)acrylate, 1-butoxypropyl (meth)acrylate, 1-methyl-(2-vinyloxy)ethyl (meth)acrylate, cyclohexyloxymethyl (meth)acrylate, methoxymethoxyethyl (meth)acrylate, benzyloxymethyl (meth)acrylate, furfuryl (meth)acrylate, 2-butoxyethyl (meth)acrylate, 2-ethoxyethoxymethyl (meth)acrylate, 2-ethoxyethyl (meth)acrylate, allyloxymethyl (meth)acrylate, 1-ethoxybutyl (meth)acrylate, methoxymethyl (meth)acrylate, 1-ethoxyethyl (meth)acrylate, ethoxymethyl (meth)acrylate; (meth)acrylates of halogenated alcohols such as 2,3-dibromopropyl (meth)acrylate, 4-bromophenyl (meth)acrylate, 1,3-dichloro-2-propyl (meth)acrylate, 2-bromoethyl (meth)acrylate, 2-iodoethyl (meth)acrylate, chloromethyl (meth)acrylate;

oxiranyl (meth)acrylates, such as 2,3-epoxybutyl (meth)acrylate, 3,4-epoxybutyl (meth)acrylate, glycidyl (meth)acrylate;

amides of (meth)acrylic acid, e.g. N-(3-dimethylaminopropyl)(meth)acrylamide, N-(diethylphosphono)(meth)acrylamide, 1-(meth)acryloylamido-2-methyl-2-propanol, N-(3-dibutylaminopropyl)(meth)acrylamide, N-tert-butyl-N-(diethylphosphono)(meth)acrylamide, N,N-bis(2-diethylaminoethyl)(meth)acrylamide, 4-(meth)acryloylamido-4-methyl-2-pentanol, N-(methoxymethyl)(meth)acrylamide, N-(2-hydroxyethyl)(meth)acrylamide, N-acetyl(meth)acrylamide, N-(dimethylaminoethyl)(meth)acrylamide, N-methyl-N-phenyl(meth)acrylamide, N,N-diethyl(meth)acrylamide, N-methyl(meth)acrylamide, N,N-dimethyl(meth)acrylamide, N-isopropyl(meth)acrylamide;

heterocyclic (meth)acrylates, such as 2-(1-imidazolyl)ethyl (meth)acrylate, 2-(4-morpholinyl)ethyl (meth)acrylate and 1-(2-methacryloyloxyethyl)-2-pyrrolidone;

phosphorus-, boron- and/or silicon-containing (meth)acrylates, such as 2-(dimethylphosphato)propyl (meth)acrylate, 2-(ethylenephosphito)propyl (meth)acrylate, dimethylphosphinomethyl (meth)acrylate, dimethylphosphonoethyl (meth)acrylate, diethyl (meth)acryloylphosphonate, dipropyl (meth)acryloyl phosphate;

sulphur-containing (meth)acrylates, such as ethylsulphinylethyl (meth)acrylate, 4-thiocyanatobutyl (meth)acrylate, ethylsulphonylethyl (meth)acrylate, thiocyanatomethyl (meth)acrylate, methylsulphinylmethyl (meth)acrylate, bis((meth)acryloyloxyethyl) sulphide;

bis(allyl carbonates), such as ethylene glycol bis(allyl carbonate), 1,4-butanediol bis(allyl carbonate), diethylene glycol bis(allyl carbonate);

vinyl halides, such as vinyl chloride, vinyl fluoride, vinylidene chloride and vinylidene fluoride;

vinyl esters, such as vinyl acetate.

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl ethers and isoprenyl ethers;

maleic acid and maleic acid derivatives, such as mono- and diesters of maleic acid, the alcohol radicals having from 1 to 9 carbon atoms, maleic anhydride, methylmaleic anhydride, maleimide, methylmaleimide;

fumaric acid and fumaric acid derivatives, such as mono- and diesters of fumaric acid, the alcohol radicals having from 1 to 9 carbon atoms.

for completeness, a di(meth)acrylate listed under monomer (A) may also be used as monomer (B).

In this context, the term (meth)acrylates encompasses methacrylates and acrylates and also mixtures of the two. Correspondingly, the term (meth)acrylic acid encompasses methacrylic acid and acrylic acid and also mixtures of the two.

The ethylenically unsaturated monomers may be used individually or in the form of a mixture.

In principle, the composition of the inventive monomer mixtures may be as desired. It can be utilized to match the property profile of the inventive plastic to the demands of the application. However, it has proven to be highly advantageous to select the composition of the monomer mixture in such a way that the prepolymer composed of polymethacrylate and of polythiols or of alkyl dithiols and compound(s) of the formula (I) and (II) and styrene mix homogeneously at the desired polymerization temperature, because mixtures of this type are easy to handle due to their generally low viscosity and, furthermore, can be polymerized to give homogeneous plastics with better properties.

According to one particularly preferred embodiment of the present invention, the monomer mixture comprises a prepolymer composed of at least 5.0% by weight, preferably at least 20.0% by weight, particularly preferably at least 50.0% by weight, of compounds of the formula (III) and of polymethacrylates, based in each case on the total weight of the monomer mixture. The proportion by weight of the compounds (I) and (II) is preferably at least 2.0% by weight, preferably at least 10.0% by weight, particularly preferably at least 20.0% by weight, based in each case on the total weight of the monomer mixture. The proportion by weight of aromatic vinyl compounds, in particular styrene, is preferably at least 2.0% by weight, preferably at least 10.0% by weight, particularly preferably at least 20.0% by weight, based in each case on the total weight of the monomer mixture.

According to one particular aspect of the present invention, the mixture comprises from 50 to 90% by weight, in particular from 60 to 85% by weight, of compounds of the formulae (I) and/or (II), from 2 to 50% by weight, in particular from 10 to 30% by weight, of the prepolymer of the monomers of the formula (III) and polymethacrylates, and from 2 to 50% by weight, in particular from 10 to 30% by weight, of aromatic vinyl compounds, in particular styrene, and from 0 to 45% by weight, in particular from 1 to 10% by weight, of monomers of the formulae (XII) and (XIII), and/or monomers (B), based in each case on the total weight of the monomer mixture.

The preparation of the monomer mixture to be used according to the invention is obvious to the person skilled in the art. By way of example, it can take place via mixing of the prepolymer composed of compounds of the formula (III) with polymethacrylates, compounds of the formulae (I) and/or (II), and of the aromatic vinyl compounds, and of the monomers (A) and (B), in a manner known per se.

For the purposes of the present invention, the monomer mixture is preferably flowable at atmospheric pressure and temperatures in the range from 20.0 to 80.0° C. The term "flowable" is known to the person skilled in the art. It characterizes a liquid which can preferably be cast into various shapes and, using suitable aids, stirred and homogenized. For the purposes of the invention, particular flowable materials have, in particular at 25° C. and at atmospheric pressure (101325 Pa) dynamic viscosities of the order of from 0.1 mPa.s to 10 Pa.s, advantageously in the range from 0.65 mPa.s to 1 Pa.s. In one particularly preferred embodiment of the present invention, a cast monomer mixture has no bubbles, in particular no air bubbles. Preference is likewise given to monomer mixtures from which bubbles, in particular air bubbles, can be removed via suitable processes, such as temperature increase and/or application of vacuum.

The inventive high-transparency plastic is obtainable via free-radical copolymerization of the low-viscosity ($\eta$<200 mPa.s) monomer mixture described above. Free-radical copolymerization is a well-known process initiated via free radicals, converting a mixture of low-molecular monomers into high-molecular-weight compounds, known as polymers. For further details reference is made to the disclosure of H. G. Elias, Makromoleküle [Macromolecules], Volume 1 and 2, Basle, Heidelberg, New York Hüthig und Wepf. 1990 und Ullmann's Encyclopaedia of Industrial Chemistry, 5th edition, headword "Polymerization Processes".

In one preferred embodiment of the present invention, the inventive plastic is obtainable via mass or bulk polymerization of the monomer mixture. Mass or bulk polymerization here means a polymerization process in which monomers are polymerized without solvent, the polymerization reaction therefore being carried out on the undiluted material or in bulk. Processes which contrast with this are polymerization in emulsion (known as emulsion polymerization) and polymerization in a dispersion (known as suspension polymerization), in which the organic monomers are suspended with protective colloids and/or stabilizers in an aqueous phase, and relatively coarse polymer particles are formed. A particular form of heterogeneous-phase polymerization is bead polymerization, which in essence is a type of suspension polymerization.

In principle, the polymerization reaction may be initiated in any manner familiar to the person skilled in the art, for example using a free-radial initiator (e.g. peroxide, azo compound) or via irradiation with UV rays or with visible light, $\alpha$-radiation, $\beta$-radiation or $\gamma$-radiation, or a combination of these.

In one preferred embodiment of the present invention, lipophilic free-radical polymerization initiators are used to initiate the polymerization. The free-radical polymerization initiators are in particular lipophilic in order to dissolve in the bulk polymerization mixture. Among compounds which may be used, besides the traditional azo initiators, such as azoisobutyronitrile (AIBN) or 1,1-azobiscyclohexanecarbonitrile, are aliphatic peroxy compounds, such as tert-amyl peroxyneodecanoate, tert-amyl peroxypivalate, tert-butyl peroxypivalate, tert-amyl 2-ethylperoxyhexanoate, tert-butyl 2-ethylperoxyhexanoate, tert-amyl 3,5,5,-trimethylperoxyhexanoate, ethyl 3,3-di(tert-amylperoxy)butyrate, tert-butyl perbenzoate, tert-butyl hydroperoxide, decanoyl peroxide, lauryl peroxide, benzoyl peroxide and any desired mixtures of the compounds mentioned. Among the abovementioned compounds, very particular preference is given to AIBN.

In another preferred embodiment of the present invention, the polymerization is initiated by using known photoinitiators, via irradiation with UV rays or the like. Use may be made here of the familiar, commercially available compounds, e.g. benzophenone, $\alpha,\alpha$-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacylphosphine oxide and other compounds, and the photoinitiators mentioned here may be used alone or in a combination of two or more or in combination with one of the above polymerization initiators.

The amount of the free-radical generators may vary widely. By way of example, amounts preferably used are in the range from 0.1 to 5.0% by weight, based on the weight of the entire composition. Particular preference is given to the use of amounts in the range from 0.1 to 2.0% by weight, in particular amounts in the range from 0.1 to 0.5% by weight, based in each case on the weight of the entire composition.

The polymerization temperature to be selected for the polymerization is obvious to the person skilled in the art. It is primarily determined via the initiator selected and the manner of initiation (thermal, via irradiation, etc.). It is known that the polymerization temperature can affect the properties of a polymer product. For the purposes of the present invention, preference is therefore given to polymerization temperatures in the range from 20.0 to 100.0° C., advantageously in the range from 20.0 to 80.0° C., in particular in the range from 20.0 to 60.0° C. In one particularly preferred embodiment of the present invention, the reaction temperature is increased during the reaction, preferably in stages.

Heat-conditioning at an elevated temperature has also proven to be advantageous, for example from 100 to 150° C., towards the end of the reaction.

The reaction may take place either at subatmospheric pressure or else at superatmospheric pressure. However, it is preferably carried out at atmospheric pressure. The reaction may take place in air or else under an inert gas, preferably with a minimum content of oxygen present, because this content has an inhibiting effect on any polymerization.

In one particularly preferred embodiment of the present invention, the procedure for preparing the inventive high-transparency plastic prepares a homogeneous mixture from the components, these being monomer mixture, initiator and other additives, e.g. lubricants, and then charges these between glass plates whose shape has been predetermined via the subsequent application, e.g. in the form of spectacle lenses or other lenses, prisms or other optical components. The bulk polymerization is initiated via introduction of energy, for example via high-energy radiation, in particular using UV light, or via heating, advantageously in a water bath and for two or more hours. This gives the optical material in its desired form as clear, transparent, colorless, hard plastic.

For the purposes of the present invention, lubricants are additives for charges of plastic materials, such as compression-molding materials and injection-molding materials, their function being to increase the slip capability of the materials charged and thus to ease the molding of the compression-molding materials. Examples of substances suitable for this purpose are metal soaps and siloxane combinations. The insolubility of the lubricant in plastics causes some of the lubricant to migrate to the surface during processing, where it acts as a release agent. Particularly suitable lubricants, such as non-ionic fluorinated agents with surface activity, non-ionic silicone agents with surface activity, quaternary alkylammonium salts and acidic phosphate esters, are described in EP 271839 A, the disclosure of which is expressly incorporated by reference for the purposes of the present invention.

The invention provides a high-transparency plastic with very good optical and mechanical properties. For example, its transmittance to DIN 5036 is preferably greater than 88.0%, advantageously greater than 89.0%.

The refractive index $n_D$ of the inventive plastic is preferably greater than or equal to 1.59. The refractive index of a medium is generally dependent on the wavelength of the incident radiation and on the temperature. The inventive data for refractive index are therefore based on the standard data specified in DIN 53491 (standard wavelength of the (yellow) D line of sodium (about 589 nm)).

According to the invention, the Abbe number of the plastic is preferably $\geq 35.0$ to DIN 53491. Information concerning the Abbe number can be found by the person skilled in the art in the literature, for example in the Lexikon der Physik [Dictionary of Physics] (Walter Greulich (ed.); Lexikon der Physik [Dictionary of Physics]; Heidelberg; Spektrum, Akademischer Verlag; Volume 1; 1998).

The Charpy impact resistance test is used to test the mechanical properties. The tests were carried out to DIN ISO 179/1fU. Measurements here gave surprisingly high impact resistance for the inventive plastic: 9.0 kJ/m². Impact resistances of comparative materials are only from 3.1 to at most 6.6 kJ/m².

The inventive plastic also advantageously has a high glass transition temperature, and therefore maintains its outstanding mechanical properties, in particular its impact strength and its hardness, even at temperatures above room temperature. The glass transition temperature of the inventive plastic is preferably greater than 80° C., advantageously greater than 90° C., in particular greater than 95° C.

Possible fields of use for the inventive high-transparency plastic are obvious to the person skilled in the art. It is particularly suitable for any application destined for transparent plastics. Its characteristic properties make it especially suitable for optical lenses, in particular for ophthalmic lenses.

The invention also provides a mixture comprising (a) a mixture according to Claim 1 and (b) at least one photochromic dye. Any of the photochromic dyes known to the person skilled in the art can be used here, as can a mixture of these.

It is preferable to use photochromic dyes such as spiro(indoline)naphthoxazines, spiro(indoline)benzoxazines, spiropyrans, acetanilides, aldehyde hydrazones, thioindigo, stilbene derivatives, rhodamine derivatives and anthraquinone derivatives, benzofuroxans, benzopyrans, naphthopyrans, organometallic dithiozonates, fulgides and fulgimides.

From these mixtures, photochromic materials can be produced which are used for example as lenses, preferably optical lenses, glass panes or glass inserts.

The following inventive examples and the comparative example serve to illustrate the invention, with no intended resultant restriction.

EXAMPLES

Synthesis of the Thiomethacrylate Mixture 75.36 g of 1,2-ethanedithiol are weighed into an Erlenmeyer flask with inert gas feed and stirred, and 416.43 g of 13% strength NaOH solution are metered in within a period of 30 minutes at from 25 to 30° C., with water cooling. A brownish, clear solution forms.

178.64 g of methacrylic anhydride and the Na thiolate solution are then metered in parallel at the desired metering temperature within a period of 45 minutes into the initial charge of stirred ethyl acetate/water in the reaction flask. Where appropriate here, inert gas is passed over the mixture. The contents of the flask generally become cooler by about 2° C. at the start of the feed, and a slightly exothermic reaction begins after about 5-10 minutes, meaning that appropriate cooling is applied in order to maintain the desired reaction temperature (35° C.). Once the feed has ended, the mixture is stirred for a further 5 minutes at 35° C. and is then cooled, with stirring, to about 25° C.

The mixture is transferred to a separating funnel and separated, and the lower, aqueous phase is discharged. For work-up, the organic phase is transferred to an Erlenmeyer flask and stirred with ®Dowex M-31 for about 15 minutes, the ion exchanger then being filtered off.

The somewhat cloudy to almost clear crude ester solution is then stabilized with 100 ppm of HQME and concentrated at not more than 50° C. on a rotary evaporator. The colorless final product is filtered at room temperature (20-25° C.). This gives about 140 g of colorless, clear ester.

Preparation of prepolymer: reaction of 2.05 g of tetraethoxylated bisphenol A dimethacrylate and 0.35 g of DMDO (dimercaptodioxaoctane) in the presence of an amine as catalyst, the method being based on EP 284374.

In an example of the preparation of a polymer based on an oligomeric thiodimethacrylate, 7.2 g of PLEX 6931, a reaction product of methacrylic anhydride and ethanedithiol, 2.4 g of the prepolymer of dimercaptodioxaoctane and tetraethoxylated bisphenol A dimethacrylate, 2.4 g of styrene, 36 mg of a UV initiator, e.g. Irgacur 819, and 24 mg of tert-butyl peroctoate or similar initiators (cf. Inventive Example 1) are mixed. The homogeneous casting resin mixture is placed in an appropriate mould and hardened within a period of 10 min in a UV curing system using a 1200 W high-pressure mercury source. The material is then heat-conditioned for a further period of about 2 h at about 120° C. in an oven.

| No. | System | Refractive index, 589 nm | Abbe No. | Impact resistance [kJ/m$^2$] | Glass transition temperature [° C.] | Odour |
|---|---|---|---|---|---|---|
| IE1 | PLEX6931 co styrene co E4BADMA-DMDO (2:1) adduct = 60:20:20 | 1.5974 | 35.0 | 9.0 | 109.0 | no |
| CE1 | PLEX6931 co styrene co E4BADMA co DMDO = 60:20:20 | 1.6024 | 35.9 | 6.6 | 84.4 | yes |
| CE2 | PLEX6931 co styrene co E4-6BADMA = 65:10:25 | 1.5979 | 36.3 | 3.1 | 107.0 | no |
| CE3 | PLEX6931 | 1.6169 | 38.9 | 3.3 | 63.9 | no |
| CE4 | PLEX6931 co E4BADMA = 80:20 | 1.6062 | 36.5 | 6.9 | 68.9 | no |
| CE5 | PLEX6931 co styrene = 80:20 | 1.6131 | 35.5 | 3.2 | 111.0 | no |

Plex 6931: reaction product of methacrylic anhydride and ethanedithiol from DE 31 6671
E4BADMA: tetraethoxylated bisphenol A dimethacrylate
E4-6BADMA: tetra- to hexaethoxylated bisphenol A dimethacrylate
DMDO: dimercaptodioxaoctane The inventive mixture (IE 1) is odorless. The Comparative Example CE1 did not pass this test.

The inventive mixture IE 1 has a high level of optical properties (refractive index, Abbe number). Physical properties (glass transition temperature and impact resistance) are excellent. The impact resistance of the inventive mixture is superior to the values of conventional mixtures (CE1, CE2, CE3, CE4 and CE5) by a factor of from ⅓ to ⅔.

The invention claimed is:

1. A mixture for preparing transparent plastics, comprising:
a) compounds of the formula (I) and (II)

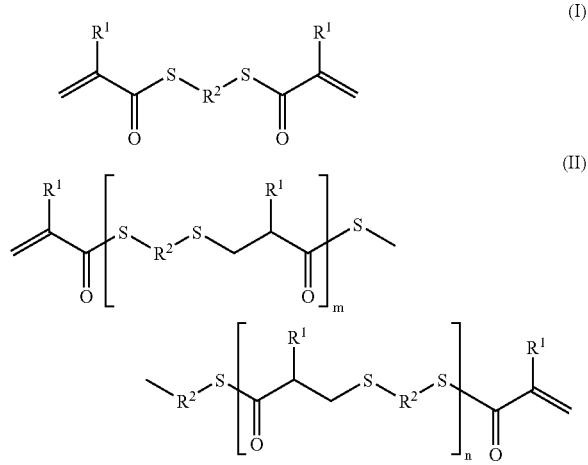

wherein
each $R^1$, independently of the others, is hydrogen or a methyl radical,
each $R^2$, independently of the others, is a linear or branched, aliphatic or cycloaliphatic radical, or a substituted or unsubstituted aromatic or heteroaromatic radical, and
each of m and n, independently of the other, is a whole number greater than or equal to 0, where m+n>0,
b) at least one prepolymer prepared from polymethacrylate and from polythiols,
c) at least one aromatic vinyl compound; and
d) optionally at least one monomer (A) capable of free-radical polymerization and having at least 2 methacrylate groups,
e) at least one an asymmetric crosslinker of the formula (XIVa)

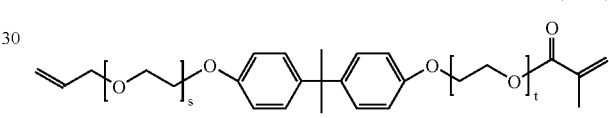

wherein s and t are greater than or equal to zero and the sum s+t is in the range from 1 to 20;
f) optionally at least one ethylenically unsaturated monomer (B);
g) or optionally, a mixture of d), e) and f).

2. The mixture according to claim 1, which comprises more than 10 mol %, based on the total amount of the compounds of the formula (I) and (II), of compounds of the formula (II) where m+n=2.

3. The mixture according to claim 1, wherein the radical $R^2$ of the formulae (I) and/or (II) is an aliphatic radical having from 1 to 10 carbon atoms.

4. The mixture according to claim 1, which comprises more than 5.8 mol %, based on the total amount of the compounds of the formula (I) and (II), of compounds of the formula (II) where m+n=3.

5. The mixture according to claim 1, which comprises from 0.1 to 50 mol %, based on the total amount of the compounds of the formula (I) and (II), of compounds of the formula (I).

6. The mixture according to claim 1, which comprises from 1 to 40 mol %, based on the total amount of the compounds of the formula (I) and (II), of compounds of the formula (II) where m+n=1.

7. The mixture according to claim 1, which comprises compounds of the formula (II) where m+n>3.

8. The mixture according to claim 1, wherein a total content of compounds of the formula (I) and (II) is at least 5.0% by weight, based on the total weight of the mixture.

9. The mixture according to claim 1, which comprises compounds of the formula (I) and (II) and is copolymerizable with the at least one prepolymer.

10. The mixture according to claim 9, which comprises di(meth)acrylates.

11. The mixture according to claim 9, which comprises ethoxylated bisphenol A dimethacrylates.

12. The mixture according to claim 1, wherein the aromatic vinyl compounds present in the mixture comprise styrene.

13. The mixture according to claim 1, the monomer (A) capable of free-radical polymerization comprises at least two methacrylate groups.

14. The mixture according to claim 1, which comprises allyl polyethylene glycol methacrylate.

15. The mixture according to claim 1, which comprises at least one ethylenically unsaturated monomer (B).

16. The mixture according to claim 15, which comprises 2-hydroxyethyl methacrylate.

17. A process for preparing transparent plastics, comprising: polymerizing a mixture according to claim 1.

18. A transparent plastic prepared by the process according to claim 17.

19. The plastic according to claim 18, having an impact resistance according to DIN ISO 179/1 fU of $\geq 9.0$ kJ/m$^2$.

20. The plastic according to claim 18, having a glass transition temperature is above 100.0° C.

21. A mixture, comprising:
(a) the mixture according to claim 1 and
(b) at least one photochromic dye.

22. A photochromic material, comprising: a mixture according to claim 21.

23. A method of using a photochromic material, comprising:
incorporating the photochromic material according to claim 22 into a lens, a glass pane or glass insert.

24. A method of using a transparent plastic comprising: incorporating the transparent plastic according to claim 18 into a lens.

25. An optical or ophthalmic lens, comprising: a transparent plastic according to claim 18.

26. A lens, a glass pane or a glass insert, comprising: the photochromic material as claimed in claim 22.

27. A mixture for preparing a transparent plastic, comprising:
a) compounds of the formula (I) and (II)

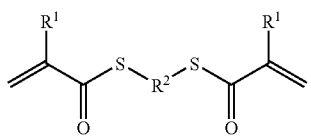

(I)

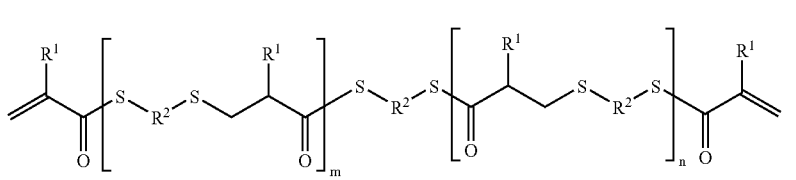

(II)

wherein
each $R^1$, independently of the others, is hydrogen or a methyl radical,
each $R^2$, independently of the others, is a linear or branched, aliphatic or cycloaliphatic radical, or a substituted or unsubstituted aromatic or heteroaromatic radical, and each of m and n, independently of the other, is a whole number greater than or equal to 0, where m+n>0, b) at least one prepolymer prepared from polymethacrylate and from polythiols, c) at least one aromatic vinyl compound; and d) optionally at least one monomer (A) capable of free-radical polymerization and having at least 2 methacrylate groups, e) at least one an asymmetric crosslinker which is a mixture of a monomer of formula (XIII) and a monomer of formula (XIVa)

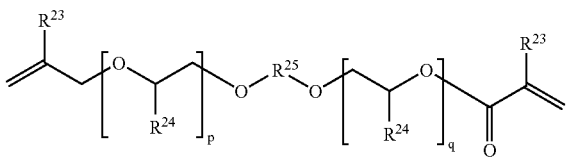

(XIII)

wherein the residues $R^{23}$ and $R^{24}$ each independently of each other are a hydrogen or a methyl residue, and the residue $R^{25}$ designates a linear or branched, aliphatic or cycloaliphatic divalent residue or a substituted or unsubstituted aromatic or heteroaromatic divalent residue, p and q are independently from 1 to 40; and

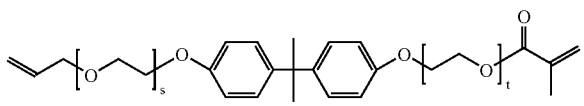

(XIVa)

wherein s and t are greater than or equal to zero and the sum s+t is in the range from 1 to 20;

f) optionally at least one ethylenically unsaturated monomer (B);

g) or optionally, a mixture of d), e) and f).

* * * * *